Dec. 30, 1952 W. J. GREENLEAF 2,623,272
CUTTING TOOL
Filed Jan. 16, 1951
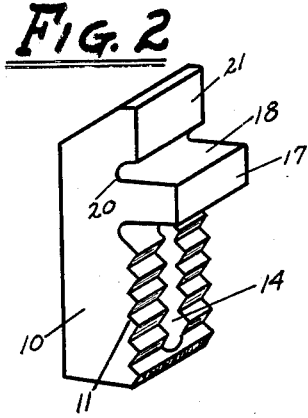
FIG. 2
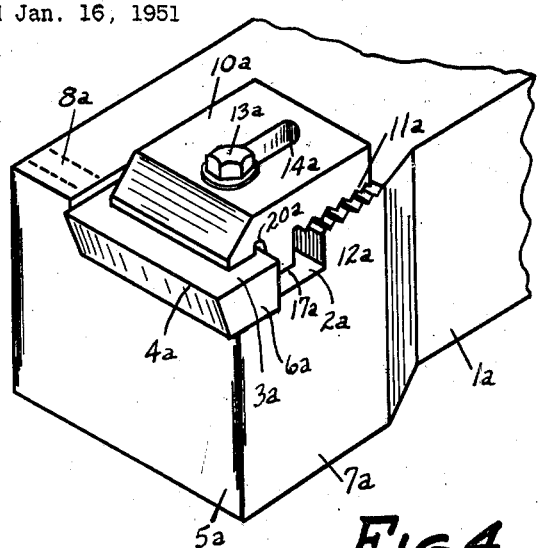
FIG. 4
FIG. 1
FIG. 3
Inventor
Walter J. Greenleaf
By Ralph Hammar
Attorney Patented Dec. 30, 1952

2,623,272

UNITED STATES PATENT OFFICE 2,623,272

CUTTING TOOL

Walter J. Greenleaf, Meadville, Pa.

Application January 16, 1951, Serial No. 206,229

1 Claim. (Cl. 29—96)

In cutting tools using bits of hard material such as cemented carbides it is desirable that the bit be firmly supported in the holder. It is also desirable that the bit be adjustable relative to the holder so that the bit can be dressed without grinding away the holder. This invention is intended to achieve these objects by a clamp having a shank adjustable relative to the holder and a clamping head engaging both the top and rear edges of the bit so as to firmly clamp the bit against a seat on the holder. In a preferred form the shank of the clamp has a serrated or notched surface co-operating with a similar surface on the holder so that the shank can be secured in any predetermined position as it is clamped down into that position on the holder. This insures positive positioning of the tool bit by predetermined increments relative to the tool holder and results in necessary adjustment to compensate for wear and allow sufficient projection of the tool bit in relation to the holder so that the tool bit only may be ground.

In the drawing, Fig. 1 is a perspective of a tool holder with the bit mounted thereon, Fig. 2 is a perspective of the adjustable clamp for clamping the tool bit against the holder, Fig. 3 is a perspective of the tool holder, and Fig. 4 is a perspective of a modification.

Referring to the drawing, 1 indicates a tool holder having at its front end a seat 2 for a tool bit 3. The seat 2 may be machined on the holder or may be a hardened steel insert. The cutting edge 4 of the tool bit overhangs the front edge of the tool holder seat. The front side 6 of the tool bit can overhang the front 7 of the tool holder if desired, the lateral adjustment of the tool bit being made by a set screw 8 threaded in the tool holder at 9. When the tool bit is so mounted on the tool holder, the tool bit may be sharpened outside of the holder then adjusted, by means of the serrated clamp and adjusting screw 8, until the newly sharpened bit has the proper overhang for the necessary cutting clearance. The tool bit, however, may be adjusted and ground in the holder if desired.

The tool bit is positively held on the tool holder by a clamp having a shank 10 with one or more beveled serrations or other shaped projections 11 on its underside mating with corresponding serrations 12 on the tool holder. The shape of the serrations 11 and 12 is not critical, although the serrations should be shaped to take the cutting thrust. From this point of view square serrations are better than beveled serrations. Other shapes of serrations are known and may be used, e. g. buttress serrations. The shank 10 of the clamp is clamped against the tool holder by a bolt 13 extending through an elongated slot 14 in the shank 10 and through a semi-circular clearance hole 15 into a threaded hole 16 in the tool holder. On the underside of the shank in front of the slot 14 is a depending shoulder 17 having a machined surface 18, which engages the rear edge 19 of the tool bit 3. At the upper edge of the surface 18 there is an under-cut 20 below a clamping surface 21, which extends over the top of the tool bit 3. With this construction, the clamp has a clamping face 21 for clamping the tool bit 3 against the seat 2 and also a backing face 18 for engaging the rear edge of the tool bit. When the clamp is tightened against the tool holder, the tool bit is accordingly firmly supported on its top and bottom faces and also on its rear edge. This is true in any of the adjusted positions of the clamp with respect to the tool holder. From one aspect, the clamping surface 21 and the backing surface 18 constitute a clamping head at the free end of the shank 10.

When the cutting edge of the tool bit has become so worn that further dressing is not possible without grinding away the tool holder, the bolt 13 is loosened and the clamp is advanced one or more serrations with respect to the tool holder. At the same time the set screw 8 may be threaded out in case it is desired to dress the front face 6 of the tool bit. After bolt 13 is tightened, the tool bit 3 is located in the new adjusted position and is firmly supported on its top and bottom faces and on its rear edge. The cutting pressure forces the bit back against the surface 18 and thereby tends to pivot the surface 21 down against the top surface of the bit.

A plurality of serrations 11, 12 are shown in both the shank 13 and in the tool holder. Actually one serration is enough for one of these members (the shank or holder).

In Fig. 4, the construction is shown applied to a different type of cutting tool, which is, however, of the same construction in so far as the tool holder seat and clamp are concerned. Corresponding parts are indicated by the same reference numerals with the subscript a.

What I claim as new is:

In a cutting tool, a tool holder having a shank portion and a flat bit supporting portion, the flat bit supporting portion lying in a common plane throughout and being located at the junction of an end and side of the holder, a cutting bit having a flat bottom face for seating on the flat face of the bit supporting portion and being adapted for movement laterally and longitudinally across said flat portion and for projection beyond the side and end of the flat portion of the holder to present either an end cutting edge or a side cutting edge or both cutting edges simultaneously, said cutting edges forming a junction which defines a cutting point, a clamp member having a backing face for engaging and backing said bit, said clamp member being adjustable in one of said directions towards one of the outer edges of the flat supporting face and having its backing face overlying the flat supporting face and movable thereover to adjust and back said bit when adjusted towards said outer edge, and adjustable means carried by the holder and positioned at an inner edge of the flat bit supporting portion for adjusting the bit in the other direction independent of the adjustment by said clamp, whereby said bit may be independently moved either endwise or laterally over said flat surface to accommodate wear on the cutting edges of the bit and to permit selective and independent grinding of either of the projecting cutting edges.

WALTER J. GREENLEAF.

REFERENCES CITED

The following references are of record in the file of this patent:

UNITED STATES PATENTS

| Number | Name | Date |
|---|---|---|
| 2,537,837 | Labbrozzi et al. | Jan. 9, 1951 |

FOREIGN PATENTS

| Number | Country | Date |
|---|---|---|
| 413,286 | Great Britain | July 9, 1934 |
| 568,876 | Great Britain | Apr. 24, 1945 |